United States Patent [19]

Martin

[11] 4,442,275
[45] Apr. 10, 1984

[54] POLYMERIZATION PROCESS USING CATALYST HAVING AQUEOUS TITANATION OF SUPPORT WITH SOLUBILIZED TI(OR)$_4$

[75] Inventor: Joel L. Martin, Bartlesville, Okla.

[73] Assignee: Phillips Petroleum Company, Bartlesville, Okla.

[21] Appl. No.: 426,332

[22] Filed: Sep. 29, 1982

Related U.S. Application Data

[62] Division of Ser. No. 356,582, Mar. 9, 1982.

[51] Int. Cl.$^3$ ............................ C08F 4/02; C08F 4/24
[52] U.S. Cl. .................................. 526/96; 502/171; 526/348.5; 526/352
[58] Field of Search .......................................... 526/96

[56] References Cited

U.S. PATENT DOCUMENTS

| | | | |
|---|---|---|---|
| 3,622,521 | 11/1971 | Hogan et al. | 526/96 |
| 3,625,864 | 12/1971 | Horvath | 252/430 |
| 3,882,096 | 5/1975 | Shida et al. | 526/96 |
| 3,996,163 | 12/1976 | Crump et al. | 252/430 |
| 4,101,722 | 7/1978 | Hogan et al. | 526/106 |
| 4,169,926 | 10/1979 | McDaniel | 526/106 |

Primary Examiner—Stanford M. Levin

[57] ABSTRACT

A titanium hydrocarbyloxide is solubilized by reacting with a water soluble polyhydroxy organic compound and the resulting product then combined with a strong acid to form a water soluble titanium composition which is combined with an inorganic catalyst support such as silica. The resulting composition is ideally suited as a support for a chromium olefin polymerization catalyst. The procedure results in an inexpensive way of producing a catalyst capable of giving high melt flow polymer under slurry conditions.

10 Claims, No Drawings

POLYMERIZATION PROCESS USING CATALYST HAVING AQUEOUS TITANATION OF SUPPORT WITH SOLUBILIZED TI(OR)$_4$

CROSS REFERENCE TO RELATED APPLICATION

This is a divisional of copending application Ser. No. 356,582, filed Mar. 9, 1982.

BACKGROUND OF THE INVENTION

This invention relates to the use of titanium in a supported chromium catalyst.

Supported chromium catalysts have long been a dominant factor in the production of high density olefin polymers such as polyethylene. As originally commercialized, these catalysts were used in solution polymerization processes. However, it early became evident that a more economical route to many commercial grades of olefin polymers was a slurry process, that is, a polymerization process carried out at a temperature low enough that the resulting polymer is largely insoluble in the diluent. However, certain control techniques which are easily carried out in solution polymerization systems become more difficult in the slurry system. This is particularly true with regard to control of molecular weight. In a solution system, the temperature can simply be increased in order to provide a lower molecular weight, higher melt flow polymer. However, in slurry systems, there is a practical limit on the temperature increases, since the point is quickly reached wherein the polymer goes into solution and thus the value of the slurry system is lost.

In order to allow maximum utilization of the more commercially desirable slurry system, modifications of the catalyst system have been developed so as to allow the production of higher melt flow polymer. One such modification which has been utilized is to use a titanium compound in conjunction with the support. In many instances, it is desirable to use a water soluble organic titanium compound which is incorporated into the support at the hydrogel stage. However, the very few organic titanium compounds which are water soluble and hydrolysis resistant such as triethanolamine titanate tend to produce an odor in the resultant catalyst during drying. More desirable titanium compounds such as titanium isopropoxide are not water soluble or readily hydrolize to TiO$_2$ which does not afford the desired promoting effect needed, e.g. they impart little or no melt index improvement to the polymers.

SUMMARY OF THE INVENTION

It is an object of this invention to provide an improved process for utilizing titanium in a catalyst base;

It is a further object of this invention to provide a catalyst capable of giving high melt flow polymer;

It is yet a further object of this invention to provide an improved process for making supported chromium olefin polymerization catalysts;

It is still yet a further object of this invention to provide an improved process for utilizing titanium in a silica based catalyst;

It is still yet a further object of this invention to provide an improved catalyst; and It is still yet a further object of this invention to provide an improved olefin polymerization process.

In accordance with this invention, a titanium hydrocarbyloxide is reacted with a polyhydroxy organic compound and thereafter the resulting product is combined with a strong acid to form a water soluble titanium composition for use with a base for a chromium catalyst.

DESCRIPTION OF THE PREFERRED EMBODIMENTS

The inorganic catalyst support used with the solubilized titanium compound can be any refractory material including aluminum phosphate. However, the support is preferably a silica material since it is with silica supports that a problem exists with obtaining an adequate melt flow polymer under slurry conditions. Hence, the support is preferably a silica.

Throughout this application, the reference to silica means a silica-containing material generally composed of 80 to 100 weight percent silica gel, the remainder, if any, being selected from alumina, boria, thoria, zirconia, or mixtures thereof, for instance. The silica-containing material can consist essentially of catalytic grade silica and no more than 0.2 weight percent of alumina or other metal oxide. Other ingredients which do not adversely affect the catalyst but which are present to produce some unrelated result can also be present.

The solubilized titanium compound can be incorporated into the support in either the hydrogel or xerogel stage. Generally, it will be incorporated as an aqueous solution into the hydrogel and thereafter the hydrogel is dried. While the drying can be carried out by azeotropic distillation or washing with a water soluble volatile organic compound, such as an alcohol, ether, or ester, it is a purpose of this invention to avoid the necessity for azeotrope drying. Consequently, the hydrogel is generally converted to a xerogel by means of a conventional drying technique such as spray drying, tray drying, oven drying, and the like, spray drying being preferred.

The titanium hydrocarbyloxide used in this invention is a material of the formula Ti(OR)$_4$ where R is a hydrocarbyl group. Preferably, R is a 1 to 12 carbon atom alkyl group, more preferably a 2 to 4 carbon atom alkyl group, most preferably titanium tetraisopropoxide.

Preferred polyhydroxy organic compounds are polyglycol ethers.

The acid is a strong acid, preferably a strong organic acid since they can be burned off, such as oxalic acid or maleic acid, oxalic acid being preferred. Other suitable acids based on the desirability of using a strong organic acid are dichloroacetic and trichloroacetic acid which have pK's of 1.3 and 0.9, respectively. Also suitable is nitric acid although it is less desirable because of corrosive products produced during combustion. Generally, the acid will have a pK of about 2 or less.

The titanium compounds used in the prior art are generally used in an amount sufficient to give titanium in an amount within the range of 0.1 to 10, preferably 0.5 to 5 weight percent based on the weight of the dry silica gel. In accordance with this invention, the same amounts can be used although preferably amounts toward the higher end of these ranges are used, most preferably about 2 to 5 weight percent titanium.

The chromium can be incorporated in a number of conventional ways. First, the chromium can simply be cogelled with the silica by including a chromium component with the acid which is combined with the silicate to give the hydrogel. Alternatively, the water soluble chromium compound can be added to the hydrogel, for instance materials such as chromium trioxide, chromium nitrate and chromium acetate can be utilized. Also, chromium can be added as an anhydrous solution generally to the xerogel utilizing chromium compounds such as tertiary butyl chromate. Preferably, the chromium is already present when the titanium is incorporated or else is incorporated simultaneously with the titanium.

The chromium compound is generally incorporated in an amount sufficient to give 0.001 to 10, preferably 0.1 to 5, most preferably 0.5 to 2 weight percent chromium based on the weight of the dry base (xerogel).

The chromium and titanium-containing catalyst is given an activation or calcination treatment as is well known in the art. Generally, this treatment is carried out in an oxygen-containing ambient such as air. The activation temperature will generally be about 800° to 2000° F. (427 to 1093° C.), preferably 1200° to 1500° F. (649° to 816° C.). Also reduction and reoxidation can be utilized as is shown in McDaniel et al, U.S. Pat. No. 4,151,122 (Apr. 24, 1979), the disclosure of which is hereby incorporated by reference.

The titanium compound and the polyhydroxy compound must be reacted in an inert atmosphere such as nitrogen. The reaction takes place quickly, with contact times of 1 to 60, preferably 5 to 15 minutes being satisfactory. Normally conventional stirring is employed with room temperature and atmospheric pressure although elevated pressure and some elevated temperature or cooling could be used. No solvent is needed since one or both of the reactants are normally liquid compounds. The mole ratio of polyhydroxy compound to titanium compound is generally 0.2:1 to 5:1, preferably 2:1 to 4:1.

The resulting product, presumably a titanium complex is then contacted with the acid. This is essential since simultaneous contact of the titanium compound, the polyhydroxy organic compound and the acid will not give a solubilized product. The acid and the titanium reaction product are generally reacted slowly, for instance for a time period of 10 minutes to 24 hours, preferably ½ to 5 hours. Generally, the temperature should be kept relatively low, preferably 30° C. or below to avoid decomposition of the solubilized titanium complex to form an irreversible precipitate. The titanium complex composition formed on reacting the liquid reactants is itself a liquid. However, the titanium complex at this point is insoluble in water and even in the presence of the aqueous acid solution initially precipitates and then is solubilized and goes into solution. Because of the convenience, the most practical conditions are simply room temperature and pressure with stirring being employed. The stirring is quite beneficial and preferably is carried out vigorously. The acid, of course, is an aqueous solution. With oxalic acid particularly, some minimum amount of water is needed, this being preferably 90 moles of water per mole of titanium. There is no upper limit on the water except the smallest amount which will work satisfactorily should be used since the excess must eventually be removed. The water to titanium compound mole ratio can thus be from 1:1 to 250:1 or higher but as noted, there is no advantage to using more water than is necessary to achieve an aqueous solution. By water is meant the total water present which is the water from the aqueous acid solution water of hydration, as for instance in hydrated oxalic acid and any water that may be added. A preferred mole ratio is 20:1 to 200:1.

The acid is used in an amount to give a mole ratio of titanium compound to acid of about 0.25:1 to 2:1, preferably 0.5:1 to 1:1.

The catalyst of this invention can be used to polymerize at least one mono-1-olefin containing 2 to 8 carbon atoms per molecule, preferably ethylene, propylene, 1-butene, 1-pentene, 1-hexene, 4-methyl-1-pentene, and 1-octene. The invention is of particular applicability in producing ethylene homopolymers and copolymers from mixtures of ethylene and 0.5 to 20 mole percent of one or more comonomers selected from 1-olefins containing 3 to 8 carbon atoms per molecule. Exemplary comonomers include aliphatic 1-olefins, such as propylene, 1-butene, 1-pentene, 1-hexene, 4-methyl-1-pentene, 1-octene, and other higher olefins and conjugated or non-conjugated diolefins such as 1,3-butadiene, isoprene, piperylene, 2,3-dimethyl-1,3-butadiene, 1,4-pentadiene, 1,5-hexadiene, and other such diolefins and mixtures thereof. Ethylene copolymers preferably constitute at least about 90, preferably 97 to 99.8 weight percent polymerized ethylene units. With ethylene/1-hexene copolymers, about 98 to 99.8 mole percent ethylene is preferred, the remainder, of course being the comonomer. Propylene, 1-butene, 1-pentene, 1-hexene and 1-octene are especially preferred comonomers for use with ethylene.

The polymers can be prepared from the catalyst of this invention by solution polymerization, slurry polymerization, or other polymerization techniques using conventional equipment and contacting processes. Contacting of the monomer or monomers with the catalyst can be effected by any manner known in the art of solid catalysts. One convenient method is to suspend the catalyst in the organic medium and to agitate the mixture to maintain the catalyst in suspension throughout the polymerization process. Other known contacting methods such as fluidized bed, gravitating bed, and fixed bed can also be employed. Reference to the production of ethylene polymers in a particle form process is disclosed in U.S. Pat. No. 3,624,063, the disclosure of which is hereby incorporated by reference.

The catalyst of this invention is particularly suitable for use in slurry polymerizations. The slurry process is generally carried out in an inert diluent (medium) such as paraffin, cycloparaffin or aromatic hydrocarbon. For predominantly ethylene polymers, a temperature of about 66° to 110° C. is employed. Pressures in the particle form process can vary from about 110 to about 700 psia (0.76–4.8 MPa) or higher. The catalyst is kept in suspension and is contacted with the monomer or monomers at sufficient pressure to maintain the medium and at least a portion of the monomer or monomers in the liquid phase. The medium and temperature are thus selected such that the polymer is produced as solid particles and is recovered in that form. Catalyst concentrations can be such that the catalyst content ranges from 0.001 to about 1 weight percent based on the weight of the reactor contents.

Hydrogen can be used to control molecular weight as is known in the prior art. When used it is generally used at concentrations up to 2 mole percent of reaction mixture, preferably within the range of 0.1 to 1 mole percent of reaction mixture.

EXAMPLE I

In all of these examples, the reaction between the Ti(OR)$_4$ and the polyhydroxy compound were carried out in a dry, inert atmosphere.

To 20 mL (1110 mmoles) of deionized water at about 23° C. was added 1.58 g (12.5 mmoles) of oxalic acid dihydrate which corresponds to 12.5 mmoles anhydrous acid and 25 mmoles of $H_2O$. The stirred mixture was heated to about 40°–50° C. to produce a solution. The solution was added to a preformed viscous liquid mixture, at about 23° C., of 7.2 mL (75.8 mmoles) of diethylene glycol (DEG) and 7.4 mL (24.8 mmoles) of titanium tetraisopropoxide ($Ti(OiPr)_4$) to give a precipitate. After stirring for 30 minutes, the precipitate remained largely undissolved. The addition of 30 mL (1660 mmoles) of water and continued stirring did not put the precipitate into solution. The calculated mole ratios employed are: DEG:$Ti(OiPr)_4$ of about 3, $Ti(OiPr)_4$:acid of about 2 and $H_2O$ (total):acid of about 224.

EXAMPLE II

To 20 mL of water at about 23° C. was added 3.16 g (25 mmoles) oxalic acid dihydrate which corresponds to 25 mmoles anhydrous acid and 50 mmoles $H_2O$. As before the stirred mixture was heated to about 40°–50° C. giving a solution. The solution was then added to the preformed mixture of 75.8 mmoles DEG, and 24.8 mmoles of $Ti(OiPr)_4$ as in Example I to give a precipitate. After stirring for 30 minutes, the precipitate did not completely dissolve. However, the addition of 20 mL (1110 mmoles) of $H_2O$ along with vigorous stirring produced a solution in about 10 minutes.

The calculated mole ratios employed are: DEG:$Ti(OiPr)_4$ of about 3, $Ti(OiPr)_4$:acid of about 1 and $H_2O$ (total):acid of about 91.

Examples I and II taken together show that the molar ratio of $Ti(OR)_4$:acid (oxalic acid) are critical in obtaining a solubilized Ti-containing complex. Under the conditions of Example I were the ratio was about 2, a solution was not obtained even with a total water:acid mole ratio of about 224. In contrast, in Example II, a solubilized Ti-containing complex was obtained with a mole ratio of $Ti(OiPr)_4$:acid of about 1 even when the total water: acid mole ratio is decreased to about 91.

EXAMPLE III

To 3.6 mL (37.9 mmoles) of DEG was added 3.7 mL (12.4 mmoles) of $Ti(OiPr)_4$ and the resulting viscous liquid mixture was stirred for about 10 minutes. A solution containing 1.7 mL of concentrated $HNO_3$ (15 M) in 100 mL of $H_2O$ was prepared and 50 mL (12.5 mmoles $HNO_3$) of the solution was added to the first mixture resulting in a white precipitate. The precipitate dissolved with stirring yielding a clear solution. The bottle containing the solution was opened and exposed to room air. It turned cloudy after 3 days indicating adequate shelf life, if properly stored in a cool environment. The calculated DEG:$Ti(OiPr)_4$ mole ratio is about 3, the calculated $Ti(OiPr)_4$:acid mole ratio is about 1 and the calculated water:acid mole ratio is about 216.

The above procedure was repeated except that a calculated DEG:$Ti(OiPr)_4$ mole ratio of about 2 was employed and a slightly turbid solution was obtained. The turbidity indicates hydrolysis of the Ti composition, an unsatisfactory product for use.

The above procedure was repeated except that nitric acid was not employed, only water. A white precipitate formed that could not be dissolved in the reaction medium.

The above procedure was repeated except that 1.42 mL (25 mmoles) of glacial acetic acid (diluted with water) pK=4.75 was used in place of the $HNO_3$ solution. A solubilized complex was not produced.

The results show that a DEG:$Ti(OiPr)_4$ mole ratio above about 2 is desirable to obtain clear solutions of the solubilized complex under the conditions employed and that the weak acid, acetic acid, cannot be used in place of the strong acid, $HNO_3$.

EXAMPLE IV

A mixture of 37.9 mmoles DEG and 12.4 mmoles $Ti(OiPr)_4$ was mixed in a beverage bottle to yield a viscous liquid mixture. A solution containing 0.83 mL of concentrated nitric acid (12.4 mmoles) in 50 mL of water was added. The thick mixture was converted into a clear solution after stirring for about 15 minutes.

The above procedure was repeated except that DEG was omitted. A white precipitate formed that would not dissolve in the reaction medium.

These results show that the presence of DEG is needed to obtain a solubilized Ti-containing complex.

EXAMPLE V

In a beverage bottle at about 23° C. was added 7.2 mL (75.8 mmoles) of DEG and 3.7 mL (12.4 mmoles) of $Ti(OiPr)_4$. After stirring the mixture for 15 minutes, a solution containing 0.50 g oxalic acid dihydrate (3.96 mmoles) corresponding to 3.96 mmoles anhydrous acid and 7.92 mmole $H_2O$, in 50 mL distilled $H_2O$ (2770 mmoles) was added to the DEG-$Ti(OiPr)_4$ mixture yielding a precipitate. The precipitate did not go into solution even after 6½ hours on a shaker.

The calculated mole ratios are: DEG:$Ti(OiPr)_4$ of about 6, $Ti(OiPr)_4$:acid of about 3, and a total $H_2O$:acid of about 700. Thus even in the presence of larger amounts of DEG, a $Ti(OiPr)_4$:acid ratio of 3 is too high.

A beverage bottle was charged with 3.6 mL (37.9 mmoles) of DEG and 3.7 mL (12.4 mmoles) of $Ti(OiPr)_4$. After stirring for 15 minutes to allow time for reaction to form the titanium complex, there was added an aqueous solution of 1.58 g (12.5 mmoles) of oxalic acid dihydrate corresponding to 12.5 mmoles anhydrous oxalic acid and 2805 mmoles $H_2O$ (50 mL $H_2O$ plus 25 mmoles from the acid). In 45 minutes on the shaker, a solution resulted. Calculated mole ratios are: DEG:$Ti(OR)_4$ of about 3, $Ti(OiPr)_4$:acid of about 1 and $H_2O$:acid of about 224:1.

A beverage bottle was charged with 5.04 mL (53 mmoles) of DEG and 3.7 mL (12.4 mmoles) of $Ti(OiPr)_4$. After stirring for 15 minutes to allow time for reaction to form the titanium complex, there was added an aqueous solution of 1.58 g of oxalic acid dihydrate (12.5 mmoles). In 67 minutes on the shaker, a solution resulted. Calculated mole ratios are: DEG:$Ti(OiPr)_4$ of about 4, $Ti(OiPr)_4$:acid of about 1 and $H_2O$:acid of about 224:1.

A beverage bottle was charged with 10.08 mL (106 mmoles) of DEG and 3.7 mL (12.4 moles) of $Ti(OiPr)_4$. This liquid mixture was combined with 50 mL of water. After 5 hours in the shaker, a solution was not formed. The calculated DEG:$Ti(OiPr)_4$ mole ratio is about 8.5. This particular run shows that even at higher ratios of DEG:$Ti(OiPr)_4$ solubilization is not obtained in the absence of acid.

Example VI—Ethylene Polymerization

A series of catalyst samples was made by impregnating a commercially obtained catalyst consisting of about 1 weight percent chromium as chromium oxide supported on a microspheroidal catalytic grade silica containing about 0.1 weight percent alumina (Davison 969 grade catalyst) with titanium tetraisopropoxide treated as indicated. Control runs employing triethanolamine titanate dissolved in water and no Ti are shown. After impregnation, each sample was oven dried and activated at 760° C. (1400° F.) for 3 to 5 hours in dry air employing a fluidized bed as known in the art. Ethylene was polymerized under particle form conditions at 215° F. (102° C.) in a 1 liter, stirred stainless steel reactor in the presence of isobutane as diluent and in the absence of other common additives, e.g., hydrogen, triethylborane, etc. Each run was conducted for a time sufficient to produce about 3000 g polymer per g catalyst (g/g cat).

The titanium source and the results obtained are reported in Table I.

The beneficial effects on melt index improvement of polyethylene produced with the invention catalyst composition are self-evident.

While this invention has been described in detail for the purpose of illustration, it is not to be construed as limited thereby but is intended to cover all changes and modifications within the spirit and scope thereof.

I claim:

1. A process comprising:
    (a) reacting a titanium hydrocarbyloxide of the formula Ti(OR)$_4$ where R is a hydrocarbyl radical, with a polyhydroxy organic compound to give a reaction product;
    (b) combining the thus formed product with an aqueous solution of a strong acid to form a water soluble titanium composition;
    (c) combining said water soluble titanium composi-

TABLE I

| Run No. | Ti Source | Wt. % Ti | Ethylene Polymerization Reaction Times, min Induction | Run | Calculated Productivity g/g cat. | Polymer MI$^{(a)}$ | HLMI$^{(b)}$ | Odor | Remarks |
|---|---|---|---|---|---|---|---|---|---|
| 1 | None | 0 | 19 | 40 | 3070 | 0.018 | 5.3 | No | Control |
| 2 | triethanolamine titanate | 3 | 11 | 40 | 3240 | 0.065 | 10.8 | Yes | Control |
| 3$^{(c)}$ | solution in dilute HNO$_3$ only | 5 | 11 | 30 | 3150 | 0.01 | 6.2 | No | Control |
| 4$^{(d)}$ | solution as per invention | 3 | 15 | 32 | 3200 | 0.056 | 10.0 | No | Invention |

$^{(a)}$Melt index, ASTM D 1238-65T (Condition E), g/10 minutes.
$^{(b)}$High load melt index, ASTM D 1238-65T (Condition F), g/10 minutes.
$^{(c)}$Dissolved in dilute HNO$_3$ solution as employed in (d).
$^{(d)}$Invention solution produced as in the first part of Example III in which 37.9 mmoles diethylene glycol, 12.4 mmoles titanium tetraisopropoxide and 12.5 mmoles HNO$_3$ as a dilute aqueous solution were combined as indicated.

The results show the invention composition (Run 4) to be equivalent in performance with triethanolamine titanate. However, no noxious fumes were emitted in the preparation and activation of the titanium promoted catalyst of the invention whereas such fumes did result from triethanol titanate.

EXAMPLE VII

Ethylene polymerization was conducted as described in Example VI except that a reaction temperature of 225° F. (107° C.) was employed. Each catalyst used was spray dried and activated for 5 hours in dry air at 760° C. as described in Example VI. The control, containing no added Ti, was the commercially obtained chromium oxide supported on silica previously described in Example VI. The invention catalyst was prepared by impregnating the control catalyst with sufficient solubilized Ti complex prepared from diethylene glycol, titanium tetraisopropoxide and oxalic acid according to the invention to provide 2.6 weight percent Ti based on the activated catalyst composition. The acid used was oxalic acid and the mole ratio of diethylene glycol to titanium tetraisopropoxide to oxalic acid was 3:1:1.

The control catalyst produced 4580 g polymer per g catalyst which was determined to have a melt index of 0.03 and a high load melt index of 6.9. Reaction time was 70 minutes after a 6 minute induction time.

The invention catalyst produced 4390 g polymer per g catalyst which was determined to have a melt index of 0.21 and a high load melt index of 17. Reaction time was 150 minutes after a 20 minute induction time.

tion while in solution with an inorganic catalyst support and a chromium compound;
    (d) activating the resulting combined product of (c) by heating at an elevated temperature in an oxygen containing ambient to produce a catalyst; and
    contacting at least one mon-1-olefin having 2 to 8 carbons atoms per molecule with said catalyst in a reaction zone under polymerization conditions to produce a polymer.

2. A method according to claim 1 wherein said at least one mono-1-olefin is selected from ethylene, propylene, 1-butene, 1-pentene, 1-hexene, 4-methyl-1-pentene, and 1-octene.

3. A method according to claim 1 wherein said at least one mono-1-olefin comprises ethylene.

4. A process according to claim 1 wherein said contacting is carried out under slurry conditions.

5. A process according to claim 1 wherein said polymer is an ethylene homopolymer or a copolymer having 97 to 99.8 mole percent polymerized ethylene units.

6. A method according to claim 1 wherein said activating is carried out in air.

7. A method according to claim 1 wherein said titanium hydrocarbyloxide is a titanium alkoxide wherein R contains 1 to 12 carbon atoms and said polyhydroxy organic compound is a polyglycol ether.

8. A method according to claim 1 wherein said titanium hydrocarbyloxide is titanium tetraisopropoxide, said polyhydroxy organic compound is diethylene glycol and said inorganic catalyst support is silica.

9. A method according to claim 1 wherein said activating is carried out in air and a temperature within the range of 1200° to 1500° F.

10. A method according to claim 1 wherein said combining of (c) is carried out while said support is in a hydrogel stage; wherein said hydrogel is converted to a xerogel by spray drying wherein said titanium hydrocarbyloxide is titanium tetraisopropoxide, said polyhydroxy organic compound is diethylene glycol and said hydrogel is a silica hydrogel; wherein said activating is carried out at a temperature within the range of 1200°–1500° F. in air; wherein titanium is present in an amount within the range of 2 to 5 weight percent on the weight of dry support; wherein said chromium compound is present in an amount sufficient to give chromium in an amount within the range of 0.1 to 5 weight percent based on the weight of dry support; wherein a mole ratio of said polyhydroxy organic compound:titanium hydrocarbyloxide is within the range of 2:1 to 4:1; wherein a mole ratio of said titanium hyrdrocarbyloxide:acid is within the range of 0.5:1; to 1:1; and wherein a mole ratio of total water:titanium hydrocarbyloxide is within the range of 1:1 to 250:1.

* * * * *